United States Patent [19]

Reiff et al.

[11] 3,708,978

[45] Jan. 9, 1973

[54] REGULATING APPARATUS FOR AXIAL PISTON MACHINES OR THE LIKE

[75] Inventors: Karl Reiff, Sersheim; Peter Mühlich, Esslinger-Sulzgries, both of Germany

[73] Assignee: Robert Bosch, GmbH, Stuttgart, Germany

[22] Filed: Aug. 12, 1971

[21] Appl. No.: 171,289

[30] Foreign Application Priority Data

Aug. 13, 1970 Germany..................P 20 40 205.5

[52] U.S. Cl. ...................60/53 R, 60/53 A, 60/52 VS
[51] Int. Cl.............................................F16h 39/46
[58] Field of Search .................60/52 VS, 53 R, 53 A

[56] References Cited

UNITED STATES PATENTS

| | | | |
|---|---|---|---|
| 2,896,411 | 7/1959 | Bowers et al. | 60/52 VS X |
| 2,932,948 | 4/1960 | Neff et al. | 60/52 VS |
| 3,163,115 | 12/1964 | Neff et al. | 60/52 VS X |
| 3,359,727 | 12/1967 | Hann et al. | 60/52 VS X |
| 3,585,797 | 6/1971 | Moon | 60/53 A |

*Primary Examiner*—Edgar W. Geoghegan
*Attorney*—Michael S. Striker

[57] ABSTRACT

A regulating apparatus for changing the position of an adjusting member for a variable-output reversible axial piston machine has a housing wherein a plenum chamber is flanked by two coaxial plungers which are movable axially to thereby move the adjusting member by way of a hydraulic power amplifier and a valve member which regulates the flow of fluid into and from the cylinder chambers of the power amplifier. The positions of the plungers can be changed by a pivotable input lever as well as by a torque limiting device which employs an auxiliary pump driven by the motor for the axial piston machine and serving to pressurize the fluid in the plenum chamber. The pressure of fluid which is delivered by the auxiliary pump is influenced by a fixed flow restrictor and by a second flow restrictor which is adjustable as a function of system pressure.

16 Claims, 4 Drawing Figures

3,708,978

REGULATING APPARATUS FOR AXIAL PISTON MACHINES OR THE LIKE

BACKGROUND OF THE INVENTION

The present invention relates to improvements in apparatus for regulating the output and the direction of operation of reversible hydrostatic machines, especially for regulating the output and the direction of operation of reversible axial piston machines which can act as pumps or as motors. More particularly, the invention relates to improvements in regulating apparatus of the type wherein the output and the direction of operation of the controlled hydrostatic machine can be regulated manually or otherwise by changing the position of a lever or an analogous movable input member. Still more particularly, the invention relates to improvements in regulating apparatus of the type wherein the system pressure which is produced by the machine can be utilized to automatically limit the torque upon the machine—independently of the selected setting of the input members—in such a way that the product of system pressure and output of the machine remains constant.

German printed publication (DAS) No. 1,154,698 discloses a regulating apparatus which insures that the product of the output of the hydrostatic machine and the system pressure remains constant irrespective of the setting of the input member. A drawback of the regulating apparatus which is disclosed in this publication is that it comprises a very large number of pistons, cams and many other precision-finished mechanical parts. For example, a hyperbolical cam must be employed to insure a hyperboloid characteristic of the limitation of torque. It was found that the complexity of parts contributes to high initial cost and causes frequent malfunctioning of such regulating apparatus.

SUMMARY OF THE INVENTION

An object of the invention is to provide a novel and improved regulating apparatus for hydrostatic machines which is simpler, more compact and more reliable than heretofore known regulating apparatus.

Another object of the invention is to provide an apparatus which can regulate the operation of an axial piston machine or an analogous hydrostatic machine with a high degree of accuracy and which is more versatile than conventional regulating apparatus.

A further object of the invention is to provide an apparatus which can be used with advantage to regulate the operation of hydrostatic machines forming part of transmissions for automotive vehicles or the like.

A feature of the invention resides in the provision of a combination which comprises a variable-output reversible hydrostatic machine (such as a reversible axial piston which can be operated as a motor), adjusting means which is movable between several positions to thereby determine the output and the direction of operation of the machine, and novel regulating means for moving the adjusting means. The regulating means comprises power amplifier means (which preferably includes a differential piston) operatively connected with the adjusting means to change the position of such adjusting means, housing means defining a plenum chamber and preferably including a cylinder for the power amplifier means, a pair of movable plungers flanking the plenum chamber, motion transmitting means (preferably including a reciprocable valve member which can regulate the flow of fluid to and from the chambers of the cylinder for the differential piston of the power amplifier means) interposed between the amplifier means and the plungers to move the amplifier means and to thus change the position of the adjusting means in response to movement of at least one of the plungers, an input member movable relative to the housing means to thereby change the positions of the plungers (such input member may include a lever which is pivotably mounted in the housing means and has two arms which flank the plungers), and torque limiting means which is responsive to the pressure of fluid which is displaced by the machine and is arranged to limit the torque upon the machine to a value which is a constant product of the system pressure and output of the machine irrespective of the position or setting of the input member.

The torque limiting means comprises an auxiliary pump which is preferably driven at the speed of the machine (for example by the output shaft of an electric motor which drives a cylinder block in an axial piston pump which constitutes the machine) and is arranged to furnish to the plenum chamber a stream of pressurized fluid, first flow restrictor means for influencing the pressure of the fluid stream (such first flow restrictor means can be designed to furnish a constant or unchanging flow restricting action upon the fluid stream), adjustable second flow restrictor means for influencing the pressure of the fluid stream, and means for adjusting the second flow restrictor means as a function of changes in the system pressure.

The novel features which are considered as characteristic of the invention are set forth in particular in the appended claims. The improved regulating apparatus itself, however, both as to its construction and its mode of operation, will be best understood upon perusal of the following detailed description of certain specific embodiments with reference to the accompanying drawing.

DESCRIPTION OF THE PREFERRED EMBODIMENTS

Figure 1:
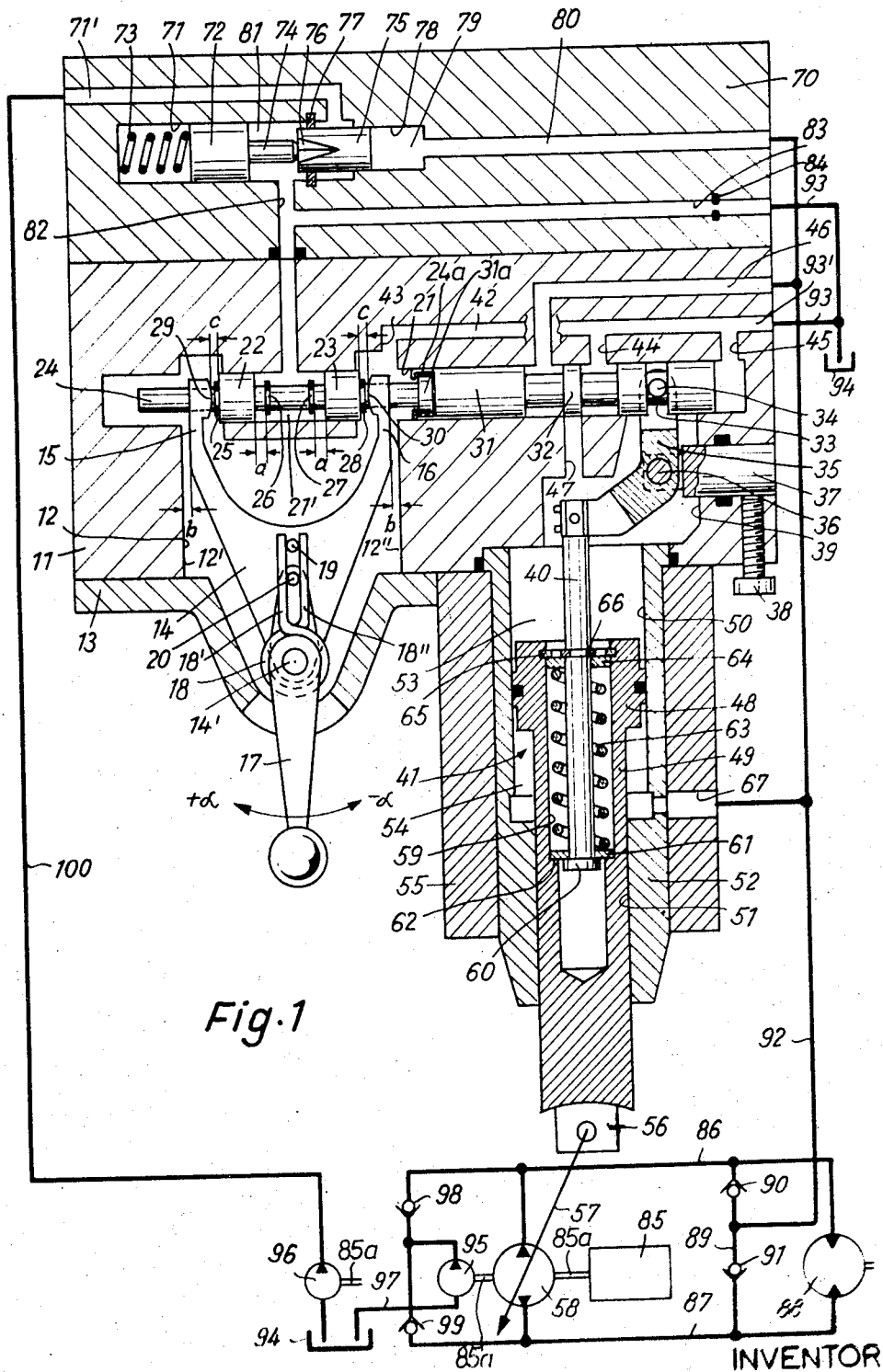
FIG. 1 is a schematic partly elevational and partly sectional view of a hydrostatic machine and of a regulating apparatus which embodies one form of the invention.

Referring first to FIG. 1, there is illustrated a regulating apparatus which serves to change the position of an adjusting member 57 for a variable-delivery reversible hydrostatic machine 58 here shown as an axial piston pump. The adjusting member 57 changes the inclination of the customary tilting plate to thereby control the length of working strokes of pistons in the rotary cylinder block as well as to reverse the direction of fluid flow through the machine 58 if the position of the tilting plate is to be changed to such an extent that the direction of liquid flow between the ports of the valve plate in the machine 58 is reversed.

The regulating apparatus comprises a housing which includes two main portions or sections 11,70 and a cover portion 13. The main portion 11 is provided with a cutout 12 the open side of which is closed by the cover portion 13. The latter supports an input member 14 here shown as a lever which is pivotable about the axis of a shaft 14' and has two bifurcated arms or prongs 15,16. These prongs extend into the cutout 12. The input member 14 can be stressed (so that it tends to pivot in a clockwise or in a counterclockwise direction) by a manually or otherwise operable actuating member 17 which is shown in the form of a lever and has a knob accessible from without the housing of the regulating apparatus. The actuating member 17 is also pivotable about the axis of the shaft 14' in the cover portion 13 and is coupled with the input member 14 by way of a biasing means here shown as a torsion spring 18 having legs 18' and 18". The legs 18', 18" flank two motion transmitting pins 19,20 which are respectively provided on the input member 14 and actuating member 17. When the actuating member 17 is pivoted in a clockwise direction (angle plus alpha), as viewed in FIG. 1, the pin 20 moves the leg 18" away from the leg 18' whereby the latter exerts a steadily increasing pressure against the pin 19 and thereby tends to pivot the input member 14 in a clockwise direction. When the actuating member 17 is pivoted in a counterclockwise direction (angle minus alpha), the pin 20 moves the leg 18' away from the leg 18" and the latter exerts a steadily increasing force against the pin 19 so as to increase the tendency of the input member 14 to pivot in a counterclockwise direction.

The main housing portion 11 is further provided with an elongated cylindrical bore 21 which is normal to the longitudinal direction of the cutout 12 and receives with minimal clearance two coaxial plungers 22,23 which are inwardly adjacent to the arms 15,16 of the input member 14. The plungers 22,23 are hollow cylinders and are readily slidable on a cylindrical motion transmitting rod 24. The space 21' between the plungers 22,23 constitutes a plenum chamber. The extent of axial movement of the plungers 22,23 with reference to the rod 24 is respectively limited by pairs of ring-shaped stops 25,26 and 27,28 which are secured to the rod 24. The outermost portion of the arm 15 on the input member 14 has an abutment 29 which is outwardly adjacent to the stop 25. A similar abutment 30 on the outermost portion of the arm 16 is outwardly adjacent to the stop 28. It will be noted that the plungers 22,23 flank the plenum chamber 21' and are in turn flanked by the arms 15,16.

The right-hand end portion of the rod 24 (as viewed in FIG. 1) has a disk-shaped flange 24a which is received in a claw-shaped end portion 31a of a valve member or spool 31. The latter is also reciprocable in the bore 21 of the main housing portion 11 and has a substantially centrally located piston or land 32 and an annular groove 33 which is adjacent to its right-hand end. The groove 33 receives one or two pins 34 provided on the bifurcated upper arm of a bell crank lever 35. The lever 35 is mounted in a cutout 39 of the main housing portion 11 and is pivotable on a pin 36 provided on an axially adjustable shaft 37 which is held in a selected axial position by a screw 38.

The lower arm of the bell crank lever 35 is articulately connected to one end of a push rod 40 which extends into a hollow differential piston 41 forming part of a power amplifier between the input member 14 and the adjusting member 57 of the machine 58.

The bore 21 of the housing portion 11 is parallel with a bore or channel 42 which has three branches 43,44 and 45. These branches communicate with axially spaced portions of the bore 21. The branch 43 communicates with the bore 21 in a region between the plunger 23 and the spool 31; the branch 44 communicates with the bore 21 to the right of the land 32; and the branch 45 communicates with the right-hand end of the bore 21 to the left of the spool 31. A further bore or channel 46 in the housing portion 11 is parallel with the channel 42 and communicates with the bore 21 in a region to the left of the land 32. A bore or channel 47 of the main housing portion 11 connects the bore 21 with the cutout 39 for the bell crank lever 35. The diameter of the bore 47 at least approximates the axial length of the land 32 so that the latter can seal this bore from the bore 21 in a selected (neutral) axial position of the spool 31.

The differential piston 41 has a larger-diameter portion 48 and a smaller-diameter portion 49. These portions are respectively reciprocable in coaxial bores 50,51 of a cylinder 52 which is secured to the housing portion 11 by a threaded retaining member 55. The larger-diameter portion 48 of the differential piston 41 divides the bore 50 of the cylinder 52 into an upper chamber 53 which communicates with the cutout 39 and hence with the channel 47; and a lower chamber 54 which surrounds the smaller-diameter portion 49. The retaining member 55 is threadedly connected with the housing portion 11 in a manner not specifically shown in FIG. 1.

The lower end portion of the differential piston 41 has an extension or flat 56 which is articulately connected with the adjusting member 57 so that the latter can change the output and/or the direction of operation of the machine 58 in response to axial displacements of the differential piston 41. The extension 56 is located without the cylinder 52. The push rod 40 extends into an axial blind bore 59 of the differential piston 41 and its lower end portion is provided with a flange 60 which can serve as an abutment for a ring-shaped spring retainer 61 in certain axial positions of the push rod 40. In certain other axial positions of the rod 40, the retainer 61 abuts against an internal shoulder 62 provided in the blind bore 59 of the differential piston 41.

The retainer 61 is engaged by the lower end convolution of a biasing means here shown as a helical spring 63 which surrounds the push rod 40 and the upper end convolution of which bears against a second ring-shaped retainer 64. The retainer 64 can abut against a split ring 65 which is recessed into an internal groove of the upper portion 48 of the differential piston 41 or against a split ring 66 which is recessed into a circumferential groove of the rod 40. Whether the retainer 64 abuts against the ring 65 or 66 depends on the axial position of the push rod 40. A radial port 67 is provided partially in the cylinder 52 and partially in the retaining member 55 to communicate with the lower pressure chamber 54 of the cylinder 52.

The parts 24–28,31,35,40 constitute a motion transmitting connection between the plungers 22,23 and the hydraulic power amplifier 41,52. The spring 63 tends to maintain the adjusting member 57 in a preselected starting position.

The main housing portion 70 is sealingly secured to the main housing portion 11 and is provided with a cylindrical bore 71 which is parallel to the bore 21. The bore 71 receives the minimal clearance a reciprocable plunger 72 which is biased in a direction to the right (as viewed in FIG. 1) by a helical spring 73. The right-hand end face of the plunger 72 is provided with a smaller-diameter projection 74 which can abut against a piston 75 reciprocable in the main housing portion 70. The peripheral surface of the piston 75 has a triangular notch 76 which can permit the flow of liquid between two bores 71' and 82 of the main housing portion 70. An annular member or ring 77 which is recessed into the housing portion 70 surrounds the piston 75 and forms therewith an adjustable throttle or flow restrictor for hydraulic fluid. The effective size of the orifice defined by the notch 76 of the flow restrictor 75, 77 depends on the axial position of the piston 75 with reference to the ring 77.

The piston 75 is reciprocable in a cylindrical bore 78 provided in the main housing portion 70 and coaxial with the bore 71. The right-hand end portion 79 of the bore 78 constitutes a pressure chamber which communicates with a bore or channel 80. That portion (81) of the bore 71 which extends between the plunger 72 and the piston 75 constitutes a further pressure chamber and communicates with the plenum chamber 21' in the housing portion 11 by way of the aforementioned bore 82. The latter is composed of two sections which are respectively machined into the main housing portions 11 and 70. The bore 82 communicates with a further bore or channel 83 which is machined into the main housing portion 70 and contains a preferably fixed flow restrictor 84. The aforementioned bore 71' of the main housing portion 70 communicates with that portion of the bore 71 which surrounds with clearance a portion of the piston 75 to the right of the ring 77. The parts 72,73 constitute two components of the means for adjusting the flow restrictor 75–77 as a function of changes in system pressure $p_{HD}$.

The rotary cylinder block of the machine 58 is driven by the output shaft 85a of a motor 85, e.g., an electric motor. The machine 58 is connected with two conduits 86,87 which communicate with the customary kidney-shaped recesses or ports in the valve plate of the machine 58 and are further connected with a hydromotor 88. A further conduit 89 connects the conduits 86,87 with each other and contains two one-way valves 90, 91 which respectively prevent return flow of liquid to the machine 58 by way of the conduits 86 and 87. The median portion of the conduit 89 (between the one-way valves 90,91) is connected with the port 67 and bores 46 and 80 by a conduit 92. A return conduit 93 connects a liquid collecting tank 94 with the bore 83 of the housing portion 70 and with the right-hand end portion 93' of the bore 42 in the main housing portion 11.

The output shaft 85a of the motor 85 further drives two auxiliary pumps 95 and 96. The pump 95 draws liquid from the tank 94 by way of a conduit 97 and delivers such liquid to the conduit 86 (via one-way valve 98) or conduit 87 (via one-way valve 99), depending upon whether the cylinder block of the machine 58 rotates in a clockwise or in a counterclockwise direction. The machine 58 constitutes with the hydromotor 88 a hydrostatic drive whose operation is controlled by the regulating apparatus of FIG. 1. The components of this drive are connected in a closed hydraulic circuit.

The auxiliary pump 96 forms part of the torque limiting means for the machine 58 and serves to draw liquid from the tank 94 and to convey a stream of pressurized liquid into the bore 71' by way of a conduit 100.

The cutout 12 in the main housing portion 11 is flanked by two surfaces 12' and 12'' which determines the extent of pivotal movement of the input member 14 with reference to the housing. The clearances $b$ shown in FIG. 1 indicate the distances between the bifurcated arms 15,16 and the surfaces 12', 12'' in the illustrated neutral position of the input member 14. The clearances between the stops 26,27 and the plungers 22,23 are shown at $a$ and the clearances between the abutments 29,30 and the outer end faces of the respective plungers 22,23 are indicated at $c$. In the illustrated neutral position of the input member 14, the distances $b$ exceed the distances $c$ but are shorter than the distances $a$ provided that the plungers 22,23 respectively abut against the stops 25 and 28.

The regulating apparatus of FIG. 1 is used as a means for controlling the operation of and for limiting the torque upon the machine 58. The drive including the machine 58 and hydromotor 88 can form part of a hydrostatic transmission for automotive vehicles.

Figure 3:
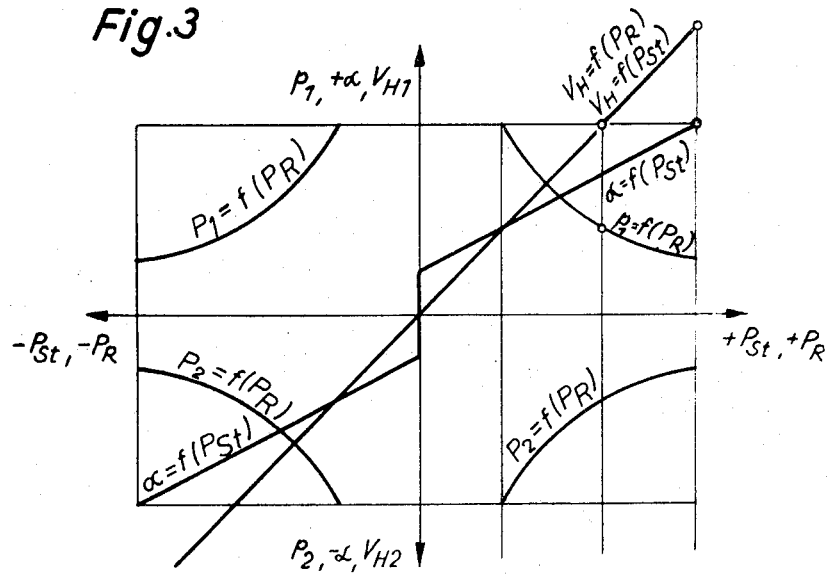
FIG. 3 is a similar diagram.
Figure 4:
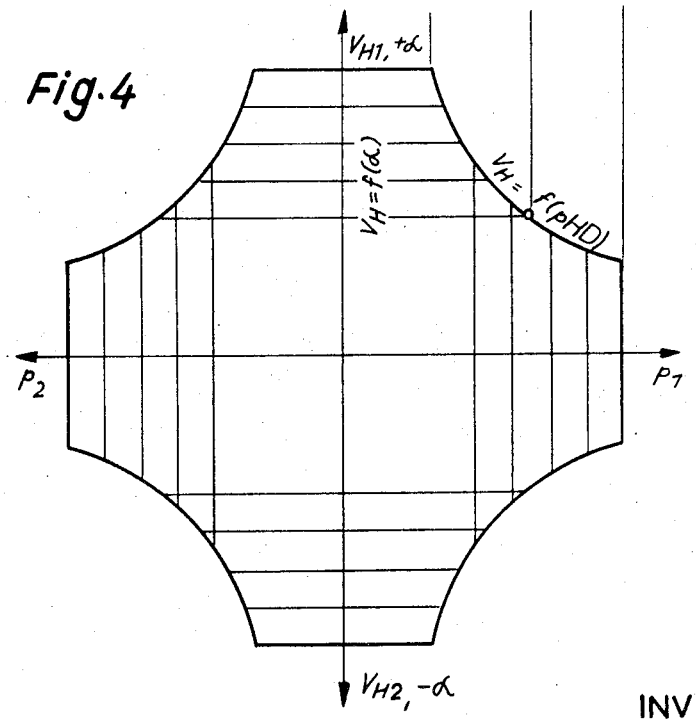
FIG. 4 is a fragmentary schematic partly sectional view of a hydrostatic machine and of a modified regulating apparatus.

Each of the diagrams shown in FIGS. 3 and 4 has four quadrants each of which represents a different operating condition of the machine 58, depending on the angular position of the actuating member 17 (angles plus and minus alpha) and on the position of the adjusting member 57. At the intersection of the abscissa and ordinate shown in each of FIGS. 3 and 4, the output of the machine 58 is zero. The magnitude of the angle plus alpha is measured along the upper part of the ordinate and the magnitude of the angle minus alpha is measured along the lower part of the ordinate. The curves in the upper right-hand and lower left-hand quadrants denote the operation of the machine 58 as a pump when its cylinder block respectively rotates in a clockwise and in a counterclockwise direction. The curves in the upper left-hand and in the lower right-hand quadrants denote the operation of the machine 58 when the latter operates as a motor (for example, during coasting of a vehicle with a hydrostatic transmission), i.e., when the machine 58 receives pressurized hydraulic fluid.

The pressure $p_1$ or $p_2$ (when the machine 58 operates as a pump or as a motor) is measured along the abscissa. The stepped curve $\alpha = f(P_{St})$ denotes the relationship between the position (angle plus or minus alpha) of the actuating member 17 and the control force $P_{St}$ which is applied to the plungers 22,23 by the abutments 29,30 of the arms 15,16 on the input member 14. The straight basic curve $V_H = f(P_{St})$ resp. $V_H = f(P_R)$ denotes the linear relationship between the output $V_H$ of the machine 58 and the control force $P_{St}$ resp. the regulating force $P_R$. The four hyperbolic curves $p = f(P_R)$ denote the relationship between the regulating force $P_R$ and the pressure $p$ of liquid which builds up in the chamber 79 of the main housing portion 70 to oppose the bias of the spring 73. Such pressure is dependent on the effective area of the throttling orifice between the piston 75 and the annular member or ring 77 and on the pressure $p_1$ or $p_2$ (in FIG. 1 uniformally the system pressure $p_{HD}$).

The operation of the regulating apparatus to adjust the machine 58 by changing the position of the adjusting member 57 in response to changes in the position of the actuating member 17 is as follows:

It is assumed that the machine 58 acts as a pump and forces pressurized liquid into the conduit 86, i.e., that the conduit 87 constitutes a low pressure line which receives liquid from the auxiliary pump 95 by way of the one-way valve 99. The system pressure $p_{HD}$ in the conduit 86 propogates itself by way of the one-way valve 90 into the conduit 92 and into the chamber 54 below the larger-diameter portion 48 of the differential piston 41. Such system pressure $p_{HD}$ also prevails in the chamber 79 at the right-hand axial end of the piston 75 and in the bore 46 and hence in the space to the left of the land 32 on the valve member or spool 31.

The auxiliary pump 96 supplies pressurized liquid into the bore 71' by way of the conduit 100. The bore 71' delivers such liquid into the notch 76 and through this notch into the pressure chamber 81 and thence into the bore 82 and plenum chamber 21' between the plungers 22,23. The regulating pressure $p_R$ in the plenum chambers 21' is applied against the plungers 22,23 which are urged against the stops 25 and 28. Such pressure does not affect the axial position of the motion transmitting rod 24.

If the output of the machine 58 is to be changed, the actuating member 17 will be pivoted, for example, in a clockwise direction through a selected angle plus alpha. The leg 18' of the torsion spring 18 then pivots the input member 14 in a clockwise direction to reduce the left-hand clearance $c$ to zero by moving the abutment 29 on the arm 15 into contact with the left-hand end face of the plunger 22. If the regulating force $P_R$ (which is created in the plenum chamber 21' by the pressure of liquid admitted from the auxiliary pump 96 via conduit 100) exceeds the force which the arm 15 of the input member 14 exerts against the plunger 22, i.e., if the plunger 22 cannot move toward the plunger 23, there develops a control force $P_{St}$ (in response to bias of the spring 18) which acts on the stop 28 by way of the piston 22, pressurized liquid in the plenum chamber 21' and plunger 23, and causes the motion transmitting rod 24 (which is rigid with the stop 28) to move in a direction to the right, as viewed in FIG. 1. The rod 24 shifts the spool 31 so that the land 32 of the spool 31 moves in a direction to the right and permits the liquid to flow between the bore 46 and channel 47. The force which the actuating member 17 applies against the spool 31 by way of the spring 18, input member 14, plungers 22, 23, fluid in the plenum chamber 21', stop 28 and rod 24 is opposed by the spring 63 which latter acts upon the spool 31 by way of the push rod 40 and bell crank lever 35. Thus, the axial position of the spool 31 is a function of the difference between the magnitude of force furnished by the torsion spring 18 (which acts on the input member 14) and the magnitude of force furnished by the spring 63. When the magnitude of the force furnished by the spring 18 (in response to pivoting of the actuating member 17) exceeds a certain value, the spool 31 moves axially and its land 32 allows pressurized fluid to penetrate into the chamber 53 of the cylinder 52 by way of the conduit 92, bores 46, 21, channel 47 and cutout 39. The pressure in the lower chamber 54 of the cylinder 52 then equals the pressure in the chamber 53 because the chamber 54 communicates with the conduit 92 by way of the port 67. Since the effective area of the differential piston 41 in the chamber 53 considerably exceeds the effective area of the differential piston in the chamber 54, the piston 41 moves downwardly, as viewed in FIG. 1, to change the position of the adjusting member 57 which adjusts the machine 58 so that the latter's output increases.

If the actuating member 17 is thereupon pivoted in a counterclockwise direction (angle minus alpha), i.e., back toward the illustrated neutral position, the control force $P_{St}$ which the abutment 29 applied against the plunger 22 decreases and the spring 63 is free to effect a leftward movement of the spool 31. The land 32 permits the flow of fluid between the chamber 53 and bore 42 by way of the channel 47 so that the fluid can flow from the chamber 53 into the tank 94 by way of the bore 42 and return conduit 93. The fluid pressure which prevails in the chamber 54 causes the differential piston 41 to move upwardly, as viewed in FIG. 1, whereby the adjusting member 57 adjusts the machine 58 so that the output of the pump decreases.

The relationship between the movements of the input member 14 and the angle alpha, the control force $P_{St}$ and the output $V_H$ of the machine 58 as a function of the control force $P_{St}$ is illustrated in FIG. 3. The angle alpha and the output $V_H$ of the machine 58 are functions of the force $P_{St}$. As long as the regulating force $P_R$ exceeds the control force $P_{St}$, the output $V_H$ of the machine 58 is proportional to the angle alpha. This applies for pivotal movements of the actuating member 17 in either direction.

The torque upon the machine 58 is limited in the following way:

In one of the aforedescribed adjustments of the machine 58, the latter can be subjected to a load of such magnitude that the motor 85 is choked. If the drive for the machine 58 is to be subjected to loads within a predetermined range, i.e., if the drive is to be protected against excessive stressing, the torque $M_D$ which is taken up by the machine 58 must be limited accordingly. Such limiting operation is carried out by the components which are mounted in the main housing portion 70. The system pressure $p_{HD}$ which is furnished by the machine 58 is propagated by way of the conduit 92 and bore 80 into the chamber 79 to act upon the piston 75. The latter can be shifted axially against the opposition of the spring 73. The notch 76 furnishes an orifice of variable size (depending on the axial position of the piston 75 with reference to the annular member or ring 77) for the flow of fluid from the bore 71' into the bore 82. A portion of such fluid can flow through the bore 83 and the fixed flow restrictor 84 to the tank 94 by way of the return conduit 93. The adjustable flow restrictor 75-77 cooperates with the fixed flow restrictor 84 to produce a regulating pressure $p_R$ which produces the aforementioned regulating force $P_R$. The latter acts in the chamber 21' and is applied to the plungers 22, 23. The hyperbolic relationship between the pressure $p_{HD}$ and the force $P_R$ can be expressed by the equation $P_R \cdot p_{HD}$ = const. The corresponding curve is illustrated in FIG. 3. Due to proportionality of $V_H$ and $P_R$, the force $P_R$ must be selected as a function of the pressure $p_{HD}$ in such a way that the desired torque $M_d$ at the motor 85 is not exceeded. The torque is defined by the equation $$M_d = p_{HD} \cdot V_H / 2\pi$$

More specifically, the torque limiting operation is carried out as follows: If the actuating member 17 is pivoted in a clockwise direction through a certain angle plus alpha, the output $+V_H$ of the machine 58 corresponds to $\alpha = f(P_{St})$ and $V_H = f(P_{St})$ as shown in FIG. 3. If the load upon the hydromotor 88 increases to bring about a rise in the system pressure $p_{HD}$ to such an extent that, at a constant pump output $V_H$, the pressure $p = f(P_R)$ (corresponding to the desired maximum torque $M_d$) reaches the value represented by the hyperbolic curve shown in FIG. 3, the control force $P_{St}$ which acts on the plunger 22 equals the oppositely directed fluid force $P_R$ for all intersections of the lines $V_H$=const. (which are parallel with the abscissa shown in FIG. 4) with the hyperbolic curve $V_H = f(p_{HD})$.

If the system pressure $p_{HD}$ continues to rise, the adjustable flow restrictor 75-77 brings about a drop in system pressure and hence in the magnitude of the force $P_R$ in accordance with the impressed hyperbolic law.

When the control force $P_{St}$ exceeds the regulating force $P_R$, the abutment 29 of the input member 14 moves the plunger 22 away from the stop 25 and shifts the plunger 22 with reference to the motion transmitting rod 24 until the arm 16 of the input member 14 reaches the surface 12" in the cutout 12. The clearance $a$ exceeds the clearance $b$ to prevent that the still existing force $P_{St}$ cannot act upon the rod 24 by way of the stop 26. The main purpose of the stops 26, 27 is to prevent such axial displacements of the plungers 22, 23 that the plungers would seal the adjacent end of the bore 82. In the neutral position of the input member 14 (in which the member 14 can be held by a suitable detent means, not shown), the clearances $c$ are smaller than the clearances $b$; otherwise, the arm 16 of the input member 14 would abut against the surface 12" in the cutout 12 before the abutment 29 would engage the plunger 22, i.e., the arm 16 could not transmit the control force $P_{St}$.

When the force $P_{St}$ exceeds the force $P_R$, the plunger 22 cannot transmit axial stresses upon the rod 24. However, the other plunger 23 applies to the rod 24 a force $+P_R$ which is determined by the adjusted pressure $p_R$, such pressure being adjusted due to movement of the plunger 22 toward the plunger 23. The rod 24 transmits the force to the spool 31. Since the bias of the spring 63 in the differential piston 41 was equal to the heretofore existing control force $P_{St}$ (for the purpose of properly balancing the system), and since $P_R < P_{St}$, the spring 63 causes the spool 31 to move in a direction to the left, as viewed in FIG. 1, i.e., toward the input member 14. Thus, the chamber 53 can communicate with the tank 94 by way of the channel 47, bore 42 and return conduit 93. The differential piston 41 then automatically adjusts the machine 58 by way of the adjusting member 57 so that the output of the machine 58 decreases.

If the magnitude of the force $+P_{St}$ is increased still further by increasing the angle plus alpha, this does not affect the output of the machine 58. However, if the angle plus alpha is reduced to such an extent that the magnitude of the force $P_R$ again exceeds the magnitude of the force $P_{St}$, the output $V_H$ of the pump 58 will be determined again by the force $P_{St}$ in accordance with the equation $V_H = f(P_{St})$. If the actuating member 17 is pivoted in a counterclockwise direction (angle minus alpha), the output $V_H$ is regulated and limited in a manner which is analogous to the just described mode of operation.

The spring 18 insures that the angular adjustment of the input member 14 and the output of the machine 58 are proportional to a force.

Figure 2:
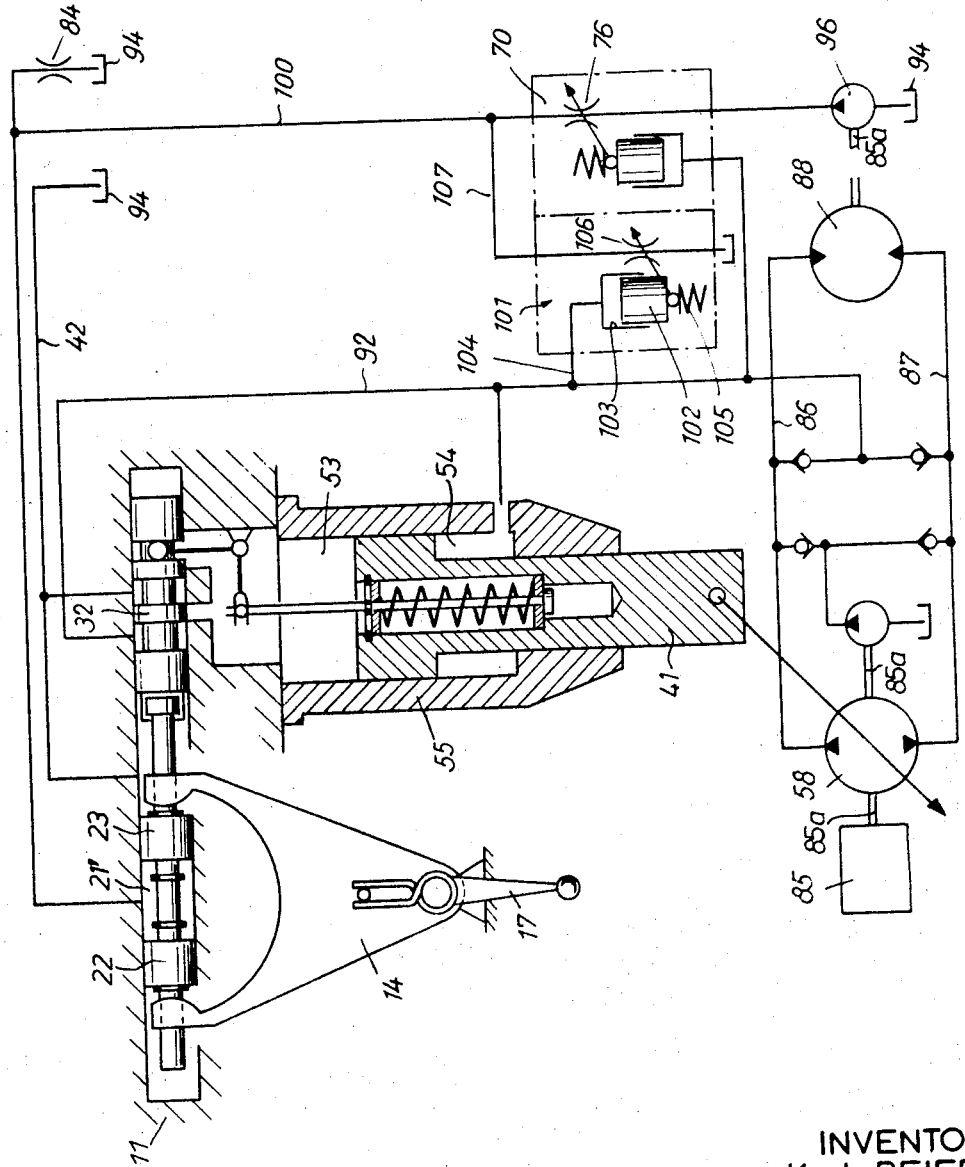
FIG. 2 is a diagram wherein the various curves illustrate several modes of operation of the hydrostatic machine.

Referring to FIG. 2 there is shown a second regulating apparatus wherein the operation of parts in the housing 11, 13, 70 (the cover member 13 not shown) is identical to the operation of parts shown in the housing of FIG. 1. The same applies for the operation of parts which are mounted in the retaining member 55. Therefore, all those parts of the second regulating apparatus which are identical with or clearly analogous to the corresponding parts of the apparatus shown in FIG. 1 are denoted by similar reference characters. The main housing portion 70 is shown detached from the main housing portion 11 for the sake of clarity.

The regulating apparatus of FIG. 2 further comprises an additional component 101 which constitutes a pressure limiting device. This device comprises a piston 102 which is reciprocable with minimal clearance in a cylindrical bore 103 of the main housing portion 70. The bore 103 communicates with a conduit 104 which in turn communicates with the conduit 92. The piston 102 is biased by a helical spring 105 and serves to control the effective cross-sectional area of a normally closed adjustable flow restrictor 106. The flow restrictor 106 is installed in a passage 107 which communicates with the conduit 100 and is connected to the tank 94. It will be noted that the passage 107 is connected in parallel with the plenum chamber 21' between the plungers 22, 23.

The operation of the flow restrictor 106 is as follows: If the system pressure $p_{HD}$ in the conduits 86 and 92 reaches a predetermined maximum value, the piston 102 is shifted axially against the opposition of the spring 105 to such an extent that the flow restrictor 106 allows the fluid to flow through the passage 107. The pressure $p_R$ in the conduit 100 collapses and the force $P_R$ decreases toward zero. This causes the spool 31 to assume an axial position in which the land 32 allows the fluid to flow from the chamber 53 into the bore 42 and back into the tank 94. The pressure in the chamber 54 causes the differential piston 41 to move the adjusting member 57 to a position in which the output of the machine 58 is reduced to zero.

An advantage of the regulating apparatus which embodies the structure of FIG. 2 is that it can act as an output regulating means, as a means for limiting the magnitude of torque as well as a means for regulating the pressures. The additional outlay for the parts 102–107 is minimal. An advantage which is shared by both illustrated embodiments of the regulating apparatus is that the torque is regulated in exact accordance with the hyperbolic curves shown in FIGS. 3–4 rather than in mere approximation of such curves as in the case of conventional regulation with several springs.

Without further analysis, the foregoing will so fully reveal the gist of the present invention that others can by applying current knowledge readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a structure of the character indicated, the combination of a variable-output reversible hydrostatic machine; adjusting means movable between several positions to thereby determine the output and the direction of operation of said machine; and regulating means for moving said adjusting means, including power amplifier means operatively connected with said adjusting means, housing means defining a plenum chamber, a pair of movable plungers flanking said chamber, motion transmitting means interposed between said amplifier means and said plungers to move said amplifier means and to thus change the position of said adjusting means in response to movement of at least one of said plungers, an input member movable relative to said housing means to thereby change the positions of said plungers, and torque limiting means responsive to the pressure of fluid which is displaced by said machine and arranged to limit the torque upon said machine to a value which is a constant product of the system pressure and output of said machine irrespective of the position of said input member, said torque limiting means comprising an auxiliary pump driven at the speed of said machine and arranged to furnish to said chamber a stream of pressurized fluid, first flow restrictor means for influencing the pressure of said fluid stream, adjustable second flow restrictor means for influencing the pressure of said fluid stream, and means for adjusting said second flow restrictor means as a function of changes in said system pressure.

2. The combination of claim 1, further comprising movable actuating means for said input member and yieldable biasing means interposed between said actuating means and said input member.

3. The combination of claim 1, further comprising means for biasing said motion transmitting means to a predetermined position corresponding to a preselected position of said adjusting means.

4. The combination as defined in claim 1, wherein said first flow restrictor means furnishes a constant flow restricting action and wherein said power amplifier means comprises a piston connected with said adjusting means and cylinder means receiving said piston and defining fluid-containing chambers bounded in part by said piston, said motion transmitting means comprising valve means for regulating the flow of fluid into and from at least one chamber of said cylinder means to thereby change the position of said piston and of said adjusting means in response to movements of said plungers.

5. The combination of claim 4, wherein said motion transmitting means further comprises an elongated motion transmitting member connected with said valve means and reciprocably supporting said plungers, and stop means provided on said motion transmitting member for limiting the extent of movement of said plungers with reference to said motion transmitting member.

6. The combination of claim 4, wherein said motion transmitting means further comprises a push rod reciprocable with reference to said piston, spring means operating between said piston and said push rod, and lever means pivotably mounted in said housing means and articulately connected with said valve means and said push rod.

7. The combination of claim 6, wherein said piston is a hollow differential piston and said spring means is mounted in the interior of said differential piston.

8. The combination of claim 1, wherein said second flow restrictor means comprises a piston reciprocably received in said housing means and having at least one peripheral notch whose cross-sectional area varies in the axial direction of said piston, and an annular member surrounding said piston, that portion of said notch which is surrounded by said annular member constituting an orifice by means of which said auxiliary pump means communicates with said plenum chamber.

9. The combination of claim 8, wherein said means for adjusting said second flow restrictor means comprises resilient means for biasing said piston in a first direction and conduit means for directing against said piston fluid at said system pressure so that such fluid urges said piston in a second direction counter to said first direction.

10. The combination of claim 1, wherein said housing means comprises a plurality of portions one of which defines said plenum chamber and another of which accommodates said first and second flow restrictor means.

11. The combination of claim 1, wherein said housing means comprises a plurality of portions one of which accommodates said power amplifier means and supports said input member.

12. The combination of claim 1, wherein said input member comprises a lever pivotable in said housing means about a predetermined axis and having two arms flanking said plungers.

13. The combination of claim 12, further comprising actuating means including a second lever pivotable about said axis, and yieldable biasing means interposed between said levers to normally pivot said first mentioned lever in response to pivoting of said second lever.

14. The combination of claim 13, wherein said biasing means comprises a torsion spring.

15. The combination of claim 1, further comprising normally sealed adjustable third flow restrictor means provided in parallel with said plenum chamber and adjusting means for opening said third flow restrictor means and for thereby reducing the pressure in said plenum chamber as a function of changes in said system pressure.

16. The combination of claim 15, wherein said last mentioned adjusting means comprises a piston reciprocable in said housing and operatively connected with said third flow restrictor means to open the latter in response to a rise of said system pressure to a predetermined maximum value.

* * * * *